(12) United States Patent
Yasui

(10) Patent No.: US 11,731,709 B1
(45) Date of Patent: Aug. 22, 2023

(54) AERO CLADDING SYSTEM FOR A VEHICLE

(71) Applicant: Toyota Motor Engineering & Manufacturing North America, Inc., Plano, TX (US)

(72) Inventor: Shinichi Yasui, Ann Arbor, MI (US)

(73) Assignees: Toyota Motor Engineering & Manufacturing North America, Inc, Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/077,728

(22) Filed: Dec. 8, 2022

(51) Int. Cl.
*B62D 35/00* (2006.01)
*B62D 35/02* (2006.01)

(52) U.S. Cl.
CPC ........... *B62D 35/008* (2013.01); *B62D 35/02* (2013.01)

(58) Field of Classification Search
CPC ....... B60R 13/04; B60R 13/043; B62D 35/00; B62D 35/008; B62D 35/02
USPC .......................................... 296/180.1, 180.2
See application file for complete search history.

(56) References Cited

U.S. PATENT DOCUMENTS

| | | | |
|---|---|---|---|
| 7,150,494 B2 | 12/2006 | Bangle et al. | |
| 9,994,267 B1 * | 6/2018 | Marmo | B62D 37/02 |
| 10,189,517 B2 * | 1/2019 | Povinelli | B62D 37/02 |
| 10,272,957 B2 * | 4/2019 | Klop | B62D 37/02 |
| 10,315,579 B2 | 6/2019 | Gaylard et al. | |
| 10,457,340 B2 * | 10/2019 | Potvin | B62D 25/02 |
| 2016/0244107 A1 * | 8/2016 | Ishiba | B62D 35/02 |
| 2017/0225623 A1 * | 8/2017 | Gaylard | B62D 37/02 |
| 2019/0084630 A1 * | 3/2019 | Potvin | B62D 37/02 |

FOREIGN PATENT DOCUMENTS

| | | |
|---|---|---|
| EP | 3381726 A1 | 3/2018 |
| JP | 2007283869 A | 11/2007 |
| WO | 2012138082 A2 | 10/2012 |

\* cited by examiner

*Primary Examiner* — Jason S Daniels
(74) *Attorney, Agent, or Firm* — Christopher G. Darrow; Darrow Mustafa PC

(57) ABSTRACT

A vehicle is provided including a body having a side, and at least one aero cladding element operably connected to the body along the side so as to be supported for movement between a cladding position and an aero position. In another aspect, an aero cladding system for a vehicle is provided. The aero cladding system includes a base cladding element and an aero cladding element operably connected to the base cladding element so as to be movable relative to the base cladding element between a first position and a second position different from the first position. At least one actuator is operably connected to the aero cladding element and is structured to be operable to move the aero cladding element between the first position and the second position.

20 Claims, 10 Drawing Sheets

FIG. 3D
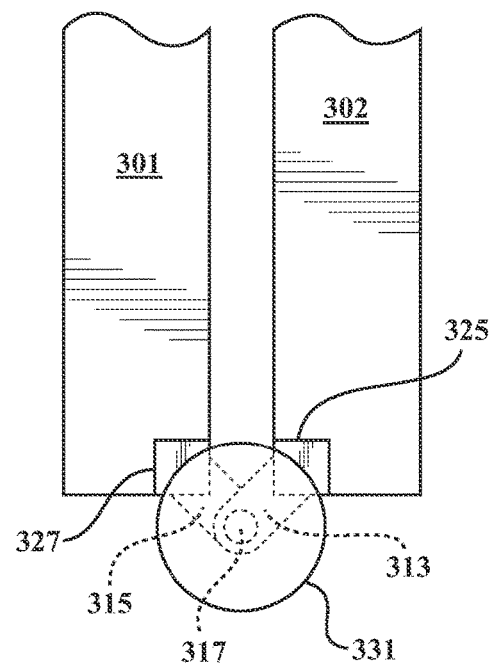
FIG. 3E
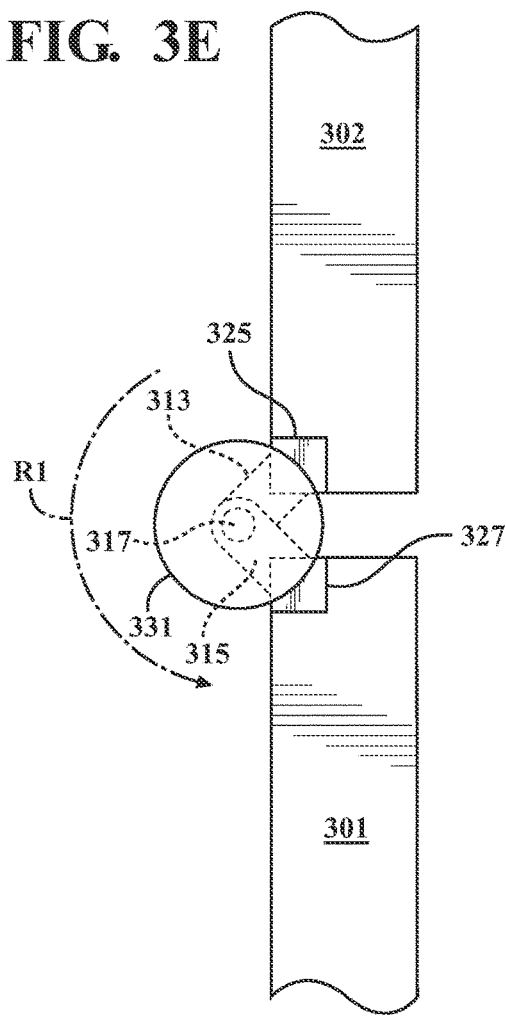
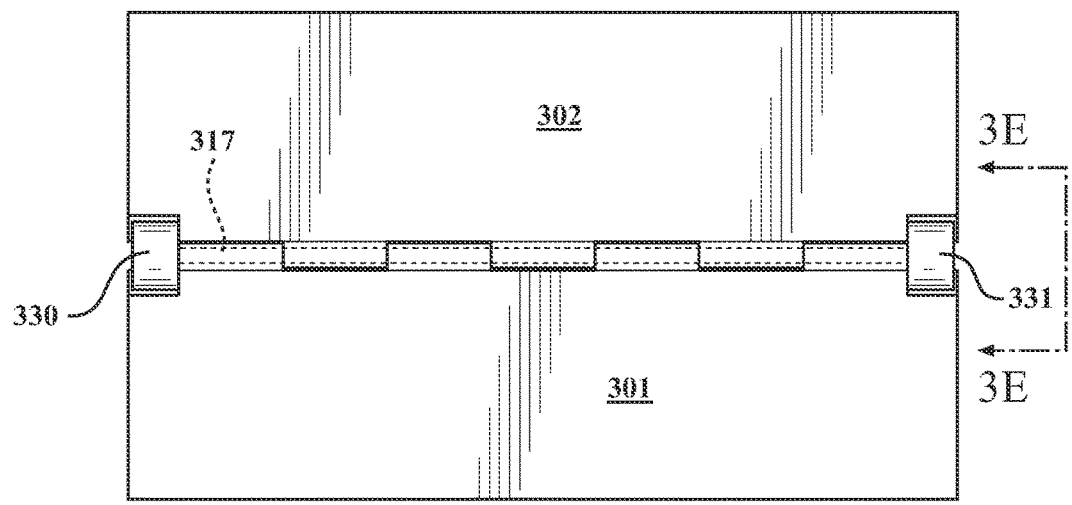
FIG. 3C

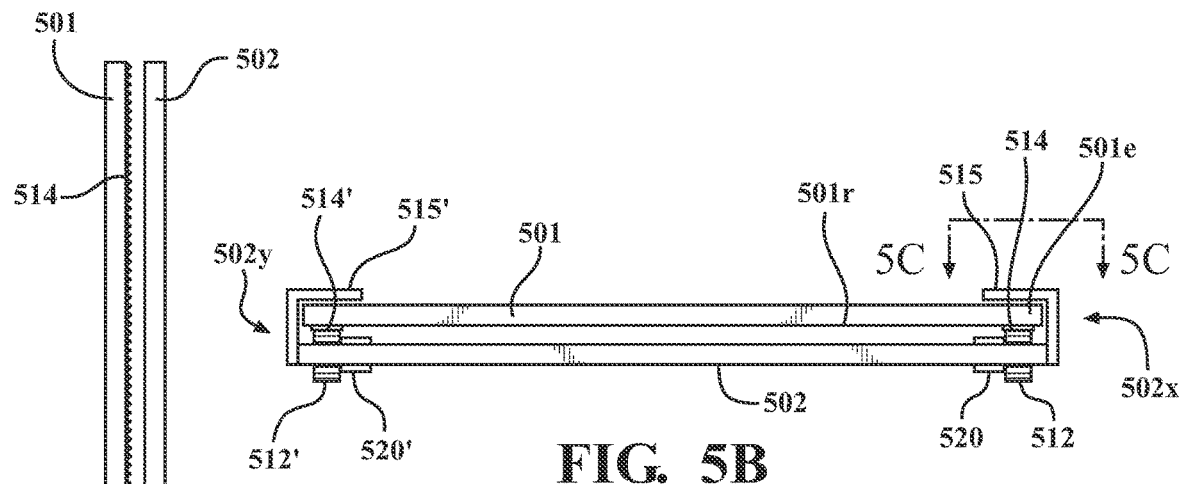
FIG. 5B
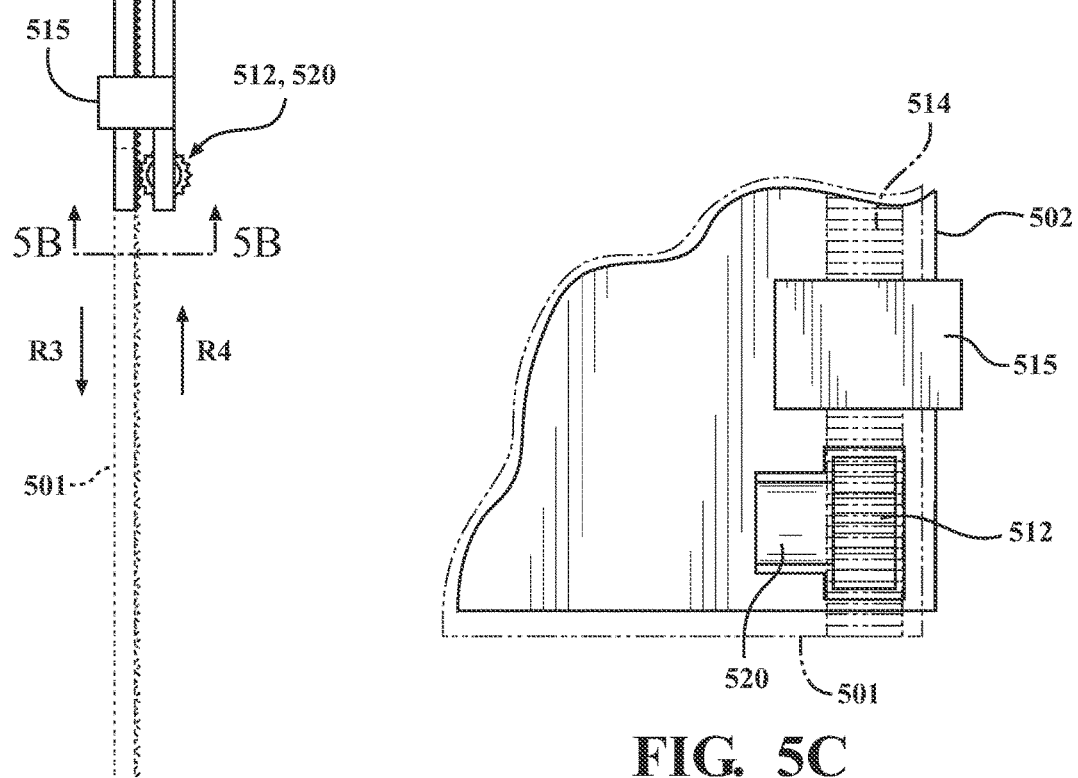
FIG. 5C
FIG. 5A

AERO CLADDING SYSTEM FOR A VEHICLE

TECHNICAL FIELD

The subject matter described herein relates to the protection of vehicle outer surfaces from damage during movement along a ground surface and, more particularly, to a dual-function cladding system operable to both protect outer surfaces of a vehicle and to provide a degree aerodynamic streamlining to the vehicle.

BACKGROUND

In the automotive field, it is known to apply plastic cladding to portions of a vehicle exterior prevent dings from rocks or debris that gets thrown up from the road while driving, to dampen the sound of the tires on the road, and to reduce corrosion from salt and water along the body of the vehicle. However, when driving at relatively high speeds along relatively smooth, clean road surfaces, the value of the cladding for these purposes may be eclipsed by the importance of reducing vehicle drag. Air flowing beneath the vehicle body (i.e., into and along the ground clearance area between the vehicle and the ground) may increase vehicle drag when the vehicle is moving at high speeds.

SUMMARY

In one aspect of the embodiments described herein, a vehicle is provided including a body having a side, and at least one aero cladding element operably connected to the body along the side so as to be supported for movement between a cladding position and an aero position.

In another aspect of the embodiments described herein, an aero cladding system for a vehicle is provided. The aero cladding system includes a base cladding element and an aero cladding element operably connected to the base cladding element so as to be movable relative to the base cladding element between a first position and a second position different from the first position. At least one actuator is operably connected to the aero cladding element and is structured to be operable to move the aero cladding element between the first position and the second position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3C is a schematic side view of the aero cladding and base cladding elements of FIGS. 3A and 3B, shown in a connected state.

FIG. 3D is a schematic edge view of a portion of the connected aero cladding and base cladding elements of FIG. 3C, showing the aero cladding element raised to a cladding position of the aero cladding element.

FIG. 3E is the view of FIG. 3D, showing the aero cladding element lowered to an aero position of the aero cladding element.

FIG. 5A is a schematic side edge view of operably connected aero cladding and base cladding elements of an aero cladding system in accordance with yet another embodiment described herein.

FIG. 5B is a schematic bottom edge view of the connected aero cladding and base cladding elements shown in FIG. 5A.

FIG. 5C is a schematic view of portions of the connected aero cladding and base cladding elements shown in FIGS. 5A and 5B, with portion of the aero cladding element shown in phantom to emphasize features controlling motion of the aero cladding element.

DETAILED DESCRIPTION

Figure 1:
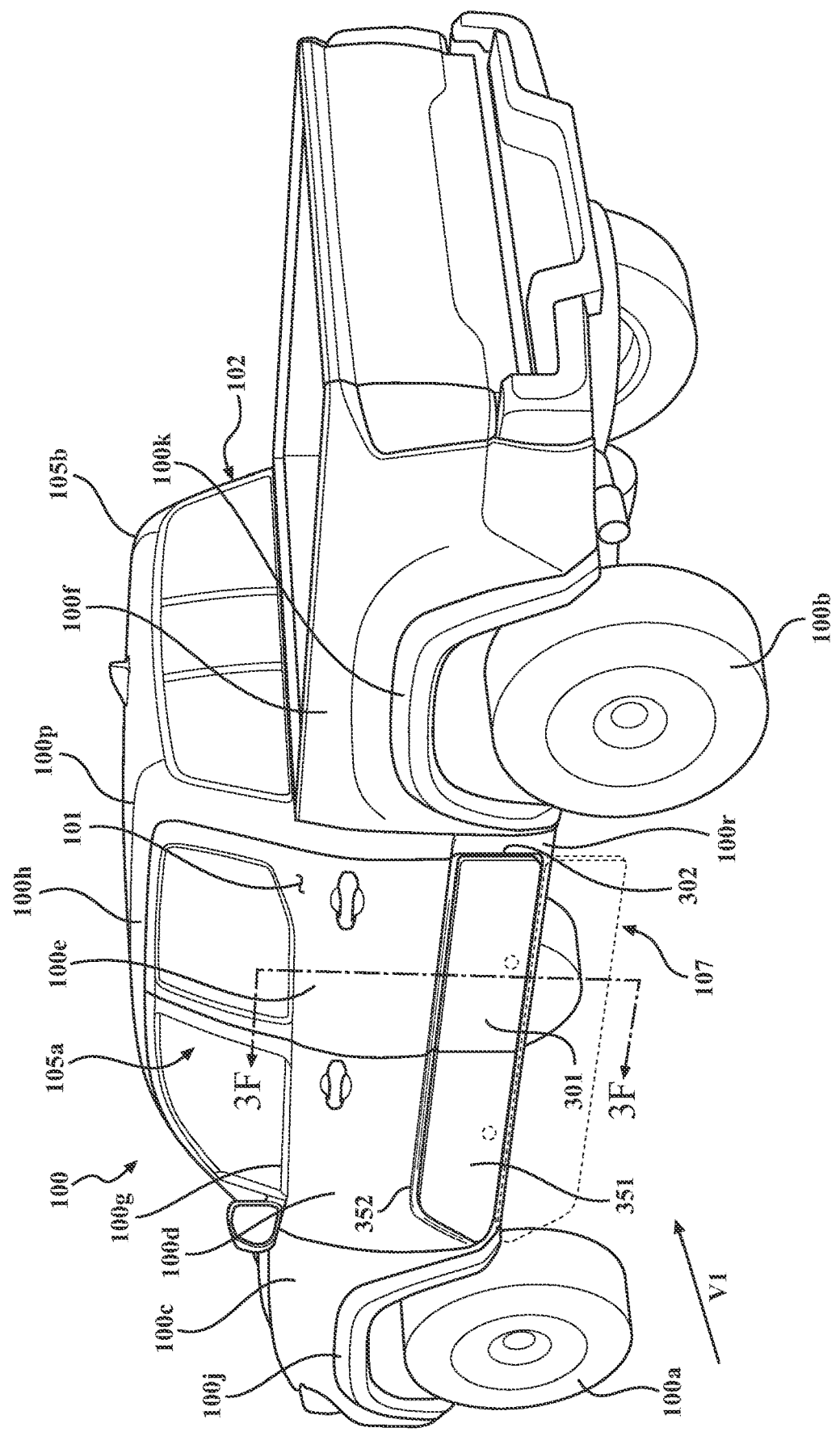
FIG. 1 is a schematic perspective view of a vehicle incorporating an aero cladding system in accordance with an embodiment described herein.

This disclosure teaches a vehicle equipped with one or more aero cladding system(s). The aero cladding system is operable to deploy a dual-function aero cladding element to form vehicle side skirting to improve the aerodynamics of the vehicle, and also to form bodyside cladding to protect outer surfaces of the vehicle and maintain the mobility of the vehicle. The disclosure also teaches various embodiments of an aero cladding system which may be built into the vehicle during fabrication or added onto the vehicle after fabrication of the vehicle.

In this description, uses of "front," "forward," and the like, and uses of "rear," "rearward," and the like, refer to the longitudinal directions of the vehicle. "Front," "forward," and the like refer to the front (fore) of the vehicle, while "rear," "rearward," and the like refer to the back (aft) of the vehicle. Uses of "inner," "outer," and the like refer to the lateral directions of the vehicle. Uses of "above," "upper," "upward," "below," "lower," "downward," and the like refer to the vertical directions of the vehicle.

It will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
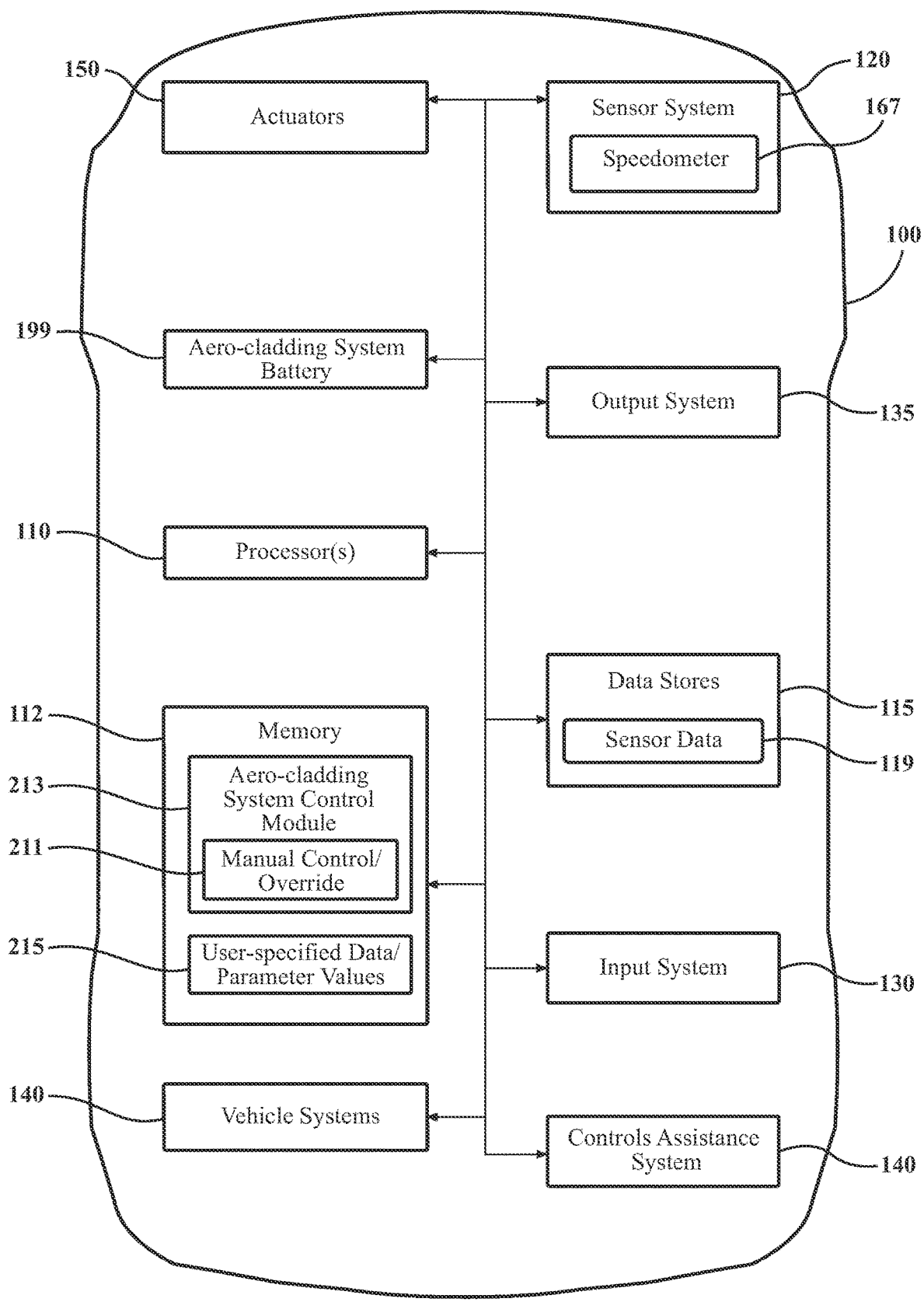
FIG. 2 is a block schematic diagram of a vehicle incorporating an aero cladding system in accordance with an embodiment described herein.

A representative vehicle 100 suitable for incorporating one or more aero cladding systems is shown in FIG. 1. FIG. 2 shows a block schematic diagram of the vehicle 100 incorporating one or more aero cladding system(s) in accordance with embodiments described herein. As used herein, a "vehicle" is any form of motorized transport. In one or more implementations, the vehicle 100 is a passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 includes various elements. It will be understood that in various embodiments it may not be necessary for the vehicle 100 to have all of the elements shown in FIGS. 1 and 2. The vehicle 100 can have any combination of the various elements shown in FIGS. 1 and 2. Further, the vehicle 100 can have additional elements to those shown in FIG. 1. In some arrangements, the vehicle 100 may be implemented without one or more of the elements shown in FIGS. 1 and 2. While the various elements are shown as being located within the vehicle 100 in FIGS. 1 and 2, it will be understood that one or more of these elements can be located external to the vehicle 100.

As shown, the vehicle 100 is a pickup truck. However, it will be understood that this disclosure is applicable in principle to otherwise similar passenger vehicle configurations. As known in the pertinent art, the vehicle has an exterior and one or more interior compartments. The compartments include a passenger compartment, an engine compartment, and, in the illustrated pickup truck configuration of the vehicle, an open-topped bed for carrying cargo. The vehicle 100 includes a body that forms the exterior and defines or otherwise encloses the compartments. In relation to the passenger compartment, the body includes two upright sides 105a, 105b, a horizontal underbody and a horizontal roof 100p extending between the sides. One side 105a is shown facing out of the page of the drawings, with the other side 105b being a mirror image. This description follows with reference to a representative side 105a. However, it will be understood that this disclosure is applicable in principle to the other side 105b.

Among other things, the vehicle 100 may include seats, a dash assembly, an instrument panel, and the like housed in the passenger compartment. In addition, the vehicle may have vehicle systems 140 (FIG. 2) including any combination of one or more motors, an engine, a transmission, and other powertrain components (not shown in the drawings) housed in the engine compartment, along the underbody, or elsewhere in the vehicle. Among the other powertrain components, the vehicle 100 includes wheels. The wheels support the remainder of the vehicle 100 from the ground. The vehicle 100 may include four wheels, two of which are front wheels, and two of which are rear wheels. One front wheel 100a and one rear wheel 100b are shown in FIG. 1, with the other front wheel and the other rear wheel being mirror images. One, some, or all of the wheels are powered by the remainder of the powertrain components to drive the vehicle 100 along the ground.

As part of the vehicle 100, and as known in the pertinent art, the vehicle body is constructed from any combination of rigidly interconnected pillars, rails, and like frame members, body panels, and other body elements, as well as any combination of trim, upholstery, and other overlying body coverings. Embodiments of the aero cladding system described herein may be constructed from any combination of the aero cladding and other cladding elements (such as the base cladding elements described herein) mounted or operably connected to the body elements. The vehicle 100 may include any combination of fasteners, adhesives, seams, welds, and the like for securing the body elements with one another and mounting the cladding elements to the body elements.

The body elements and the cladding elements described herein may have any combination of fabricated, bent, stamped, extruded, casted, molded, and like constructions, and may be made from any combination of one or more metallic materials and one or more polymeric materials. For example, the bodyside skin, including formative body elements, may have a stamped sheet metal construction, and be made from one or more metallic materials, such as steel or aluminum. The base cladding elements and the aero cladding/side skirting elements described herein, including formative cladding elements, may have molded constructions, and may be made from one or more polymeric materials, such as thermoplastics. As part of the vehicle, formative body elements and formative cladding elements may be adjacent to one another and extend substantially continuously (e.g., continuously but for panel gaps typical of passenger vehicles) along the remainder of the vehicle.

In relation to the vehicle exterior along the side, the vehicle body may include a rocker panel 100r, a beltline 100g, a roof rail 100h, and a front wheelhouse 100j for the front wheel 100a and a rear wheelhouse 100k for the rear wheel 100b. The rocker panel 100r, the beltline 100g, and the roof rail 100h may be horizontal, and vertically spaced apart from one another, with the beltline 100g above the rocker panel 100r and the roof rail 100h above the beltline 100g. The front wheelhouse 100j and the rear wheelhouse 100k may be upright, and longitudinally spaced apart from one another about the rocker panel 100r. The rocker panel 100r may extend longitudinally along the vehicle underbody between the front wheelhouse 100j and the rear wheelhouse 100k. The rocker panel 100r may define the lower periphery of the side, and may frame the open space under the side 105a between the front wheel 100a and the rear wheel 100b from above. The front wheelhouse 100j may extend longitudinally along the underbody forward of the rocker panel 100r, and may define a downward facing space for housing the front wheel 100a. The rear wheelhouse 100k may extend longitudinally along the underbody rearward of the rocker panel 100r, and may define a downward facing space for housing the rear wheel 100b. The beltline 100g may extend longitudinally across the side 105a, and the roof rail 100h may extend longitudinally along the roof 100p.

The vehicle body may also include one or more doors for the passenger compartment. As part of the doors, the body includes, in relevant part, one or more outer door panels. As shown, the body includes two doors 100d, 100e, one of which is a front door 100d and one of which is a rear door 100e. The front door 100d includes a front outer door panel and the rear door 100e includes a rear outer door panel. The front door 100d and the associated front outer door panel and the rear door 100e and the associated rear outer door panel are upright, and longitudinally adjacent to one another.

Referring to FIG. 1, the front fender 100c, outer door panels of the doors 100d, 100e, and the rear quarter panel 100f along a side of the vehicle 100 may combine to form the bodyside skin (generally designated 101) of the vehicle 100 along that side. A similar arrangement on the opposite side 105b of the vehicle 100 may form the bodyside skin of the vehicle 100 along the opposite side. From above the rocker panel 100r, the beltline 100g extends longitudinally across the doors 100d, 100e and the associated outer door panels, and defines the upper periphery of the bodyside skin 101

Referring to FIG. 2, the vehicle 100 can include one or more processors 110. In one or more arrangements, the processor(s) 110 can be a main processor(s) of the vehicle 100. For instance, the processor(s) 110 can be an electronic control unit (ECU). The vehicle 100 can also include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, the sensor data 119 can include information about a vehicle speed sensor, such as speedometer 167.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) and systems of the vehicle 100 (including any of the elements shown in FIG. 2) for storage and processing of sensor data.

The sensor system 120 can include any suitable type of sensor. It will be understood that the sensors incorporated into the sensor system are not limited to the particular sensors described. The sensor system 120 may include any sensors suitable for and/or required to perform any of the data acquisition and/or vehicle control operations contemplated herein. For example, the sensor system may include a speedometer 167 configured for detecting a ground speed of the vehicle 100.

Sensors of sensor system 120 may be communicably coupled to the various systems and components of the vehicle 100. The sensors may also be operably connected to vehicle systems and components, such as data stores 115 and processor(s) 110, for storage and processing of sensor data. The sensors may be configured to continuously acquire, measure, or otherwise determine the data and parameter values needed to perform the control functions described herein. "Continuous" determination, estimation, calculation, control, acquisition, etc. of the data and parameter values described herein refers to determination, estimation, acquisition, calculation, and control of the data and parameter values as soon as possible in accordance with times required for data and information acquisition, processing and decision-making. These determinations may be made constantly during operation of the vehicle 100.

For example, the sensor system 120 may include a speedometer 167 configured to detect a forward-moving speed of the vehicle. The speedometer may be communicably coupled to an aero cladding element control module 213 (described in greater detail below) for use in determining when to deploy and retract the aero cladding element(s) operably connected to the vehicle 100. The aero cladding element control module 213 may be configured to process vehicle speed data and other information to provide a continuously updated assessment regarding whether or not the aero cladding element(s) should be deployed (i.e., lowered) or raised (i.e., retracted).

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote user. Non-exclusive examples of output system components include screen displays, audio speakers, other sound-generating devices (such as horns and chimes), and other devices. The input and output systems 130, 135 may enable a user to generate commands to an aero cladding system and to receive information from the aero cladding system regarding the status of the system.

As stated previously, the vehicle 100 can include one or more vehicle systems, collectively designated 140. Various examples of the one or more vehicle systems 140 are described herein. However, the vehicle 100 can include more, fewer, or different vehicle systems. It should be appreciated that although particular vehicle systems may be separately defined, each or any of the vehicle systems or portions thereof may be otherwise combined or segregated via hardware and/or software within the vehicle 100.

The vehicle systems 140 can include systems such as a propulsion system, a braking system, a steering system, a throttle system, a suspension system, a transmission system, a navigation system and/or other systems (not shown in FIG.

2). In one or more arrangements, the vehicle systems may include one or more aero cladding system(s) as described herein. Each of these vehicle systems may perform an associated known function in the vehicle 100. The various vehicle 140 systems may be configured to cooperate with each other and with other systems and components to control aspects of vehicle operation, as described herein. Each of the other vehicle systems can include one or more devices, components, and/or a combination thereof, now known or later developed.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

In some arrangements, a portion of the vehicle actuators 150 may be configured to control movement of one or more aero cladding elements as described herein. Generally, aero cladding element control actuators may be mounted to the vehicle body along the side, and connected with the aero cladding element(s). For example, these actuators may be packaged within the vehicle side, the underbody, or elsewhere within the body, and connected with the aero cladding element(s) through the bodyside skin 101 or elsewhere through the vehicle exterior. The actuators 150 may be packaged on the bodyside skin 101 or elsewhere on the exterior, and connected with the aero cladding element from behind. In these and other examples, the pertinent actuators are operable to move the aero cladding element(s) between respective cladding position(s) and the aero position(s).

Embodiments of the vehicle described herein have at least one aero cladding element operably connected to the vehicle body along a side of the vehicle so as to be supported for movement between a cladding position and an aero position. As described herein, the at least one aero cladding element may form part of an aero cladding system of the vehicle. In particular arrangements, the aero cladding system may be built into the vehicle during manufacturing.

An "aero cladding element" is an element that may perform both the functions of bodyside cladding and the functions of vehicle side-skirting, depending on the position of the aero cladding element relative to the remainder of the vehicle. Accordingly, an aero cladding element may extend vertically above the vehicle rocker panel 100*r* to overlie a portion of the bodyside skin 101 (for example, a portion of a vehicle door) when in a cladding position of the element, and may project vertically below the rocker panel 100*r* to obstruct airflow into a ground clearance region 107 underneath the side 105*a* when in the aero position.

FIG. 1 shows examples of aero cladding elements 301, 351 operably connected to the side 105*a* of the vehicle 100. The cladding positions of the elements 301, 351 are indicated in solid lines, while the respective aero positions of the aero cladding elements are shown in dashed lines residing below the rocker panel 100*r*. Each of aero cladding elements 301, 351 may be associated with a respective aero cladding system. Thus, the vehicle 100 in FIG. 1 incorporates multiple adjacent aero cladding systems along the side 105*a* of the vehicle 100.

Referring to FIG. 1, the cladding position of the aero cladding element may be a position in which the aero cladding element overlies or "masks" at least a portion of a base cladding element or a portion of the vehicle, as viewable from the side of the vehicle on which the base cladding element and the associated aero cladding element are mounted (i.e., in a viewing direction V1). In the cladding position, the aero cladding element may overlie a portion of the bodyside skin 101 to function as a bodyside cladding element, to cover and protect a base cladding element and/or another portion of the vehicle. The aero position of the aero cladding element may be a position in which the element resides between the vehicle rocker panel and a ground surface supporting the vehicle. In this position, the aero cladding element may form (and function as) a side-skirting element to help prevent air from flowing into the ground clearance region 107 between the moving vehicle 100 and the ground surface GS1, thereby reducing turbulence and air resistance (especially at relatively higher speeds).

In some arrangements described herein, a base cladding element may be fixedly attached to a portion of the vehicle. The base cladding element may be securable to the vehicle (for example, to a door or rocker panel) using bolts, adhesives, or any other suitable method. The base cladding element may be positioned so that an associated aero cladding element overlies or "masks" at least a portion of the base cladding element when the aero cladding element is in its cladding position. The base cladding element may serve to protect the portion of the vehicle normally covered and protected by the aero cladding element, when the aero cladding element is lowered to its aero position.

In some arrangements, the base cladding element may also be configured to enable the aero cladding element to be operably connected thereto using one of the mechanisms described here (or another mechanism), to support the aero cladding element for movement with respect to the base cladding element, between the cladding and aero positions. In FIG. 1, base cladding elements 302 and 352 are shown mounted on the vehicle behind respective aero cladding elements 301 and 351.

Figures 3A, 3B:
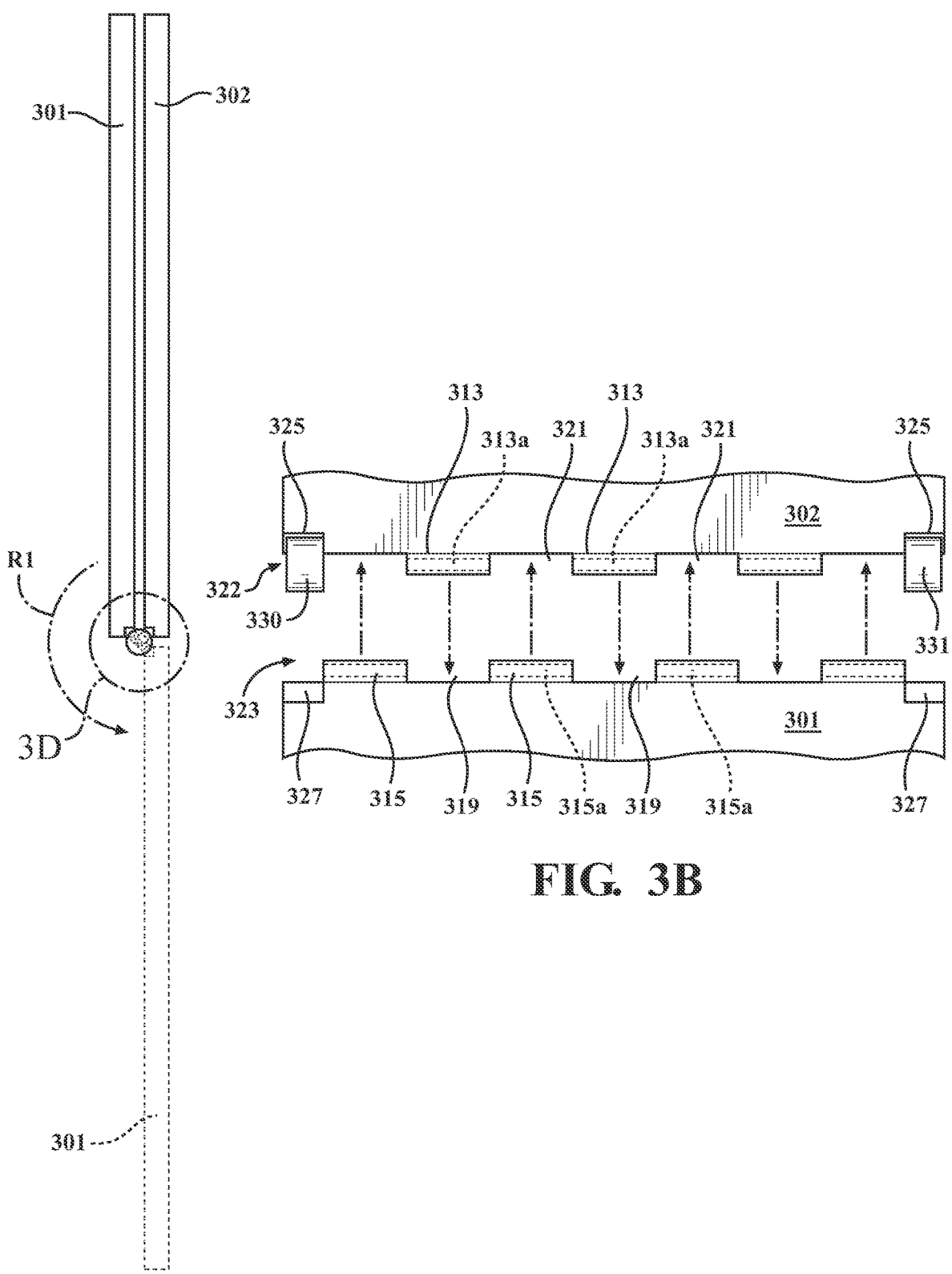
FIG. 3A is a schematic edge view of operably connected aero cladding and base cladding elements of an aero cladding system in accordance with an embodiment described herein.
FIG. 3B is a partial exploded schematic view of adjoining edges of the aero cladding and base cladding elements shown in FIG. 3A, shown prior to connection of the edges to each other.
Figure 3F:
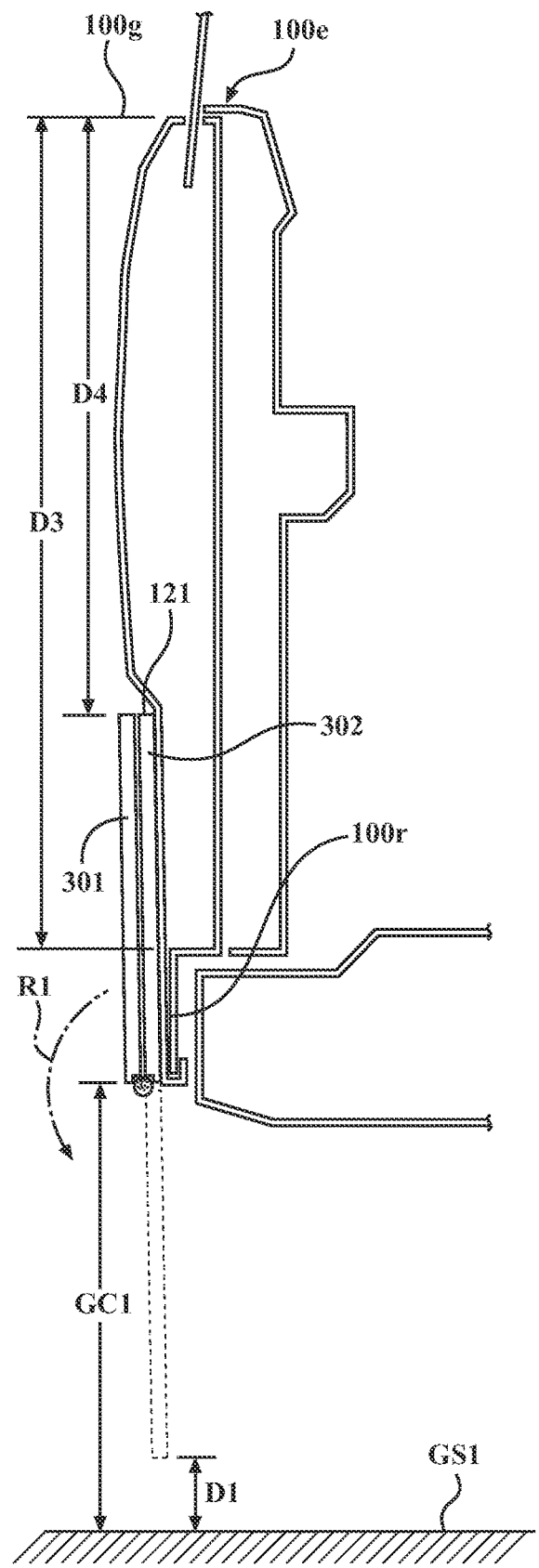
FIG. 3F is a schematic side cross-sectional view of a portion of a vehicle door shown in FIG. 1, showing a recess formed in the door and elements of an aero cladding system positioned in the recess.

Referring to FIG. 3F, in one or more arrangements, a recess 121 may be formed in the vehicle side 105*a* and configured to receive an aero cladding element and an associated base cladding element therein. FIG. 3F shows the aero cladding element 301 and base cladding element 302 of FIG. 1 received in recess 121. For example, the recess 121 may be structured to receive the aero cladding element 301, a base cladding element 302 operably connected to the aero cladding element 301, and one or more actuators (e.g., motors) operable to control movement of the aero cladding element 301 as described herein. In some arrangements, the recess 121 may be formed along the rocker panel 100*r*, in a location where a conventional cladding element would normally be attached. In other arrangements, the recess may also extend along a portion of the vehicle door 100*e*. Provision of the recess 121 may enhance the appearance of the vehicle when the aero cladding element 301 and base cladding element 302 are mounted along the vehicle side 105*a*, by enabling a laterally-outermost surface of the aero cladding element 301 to extend flush or substantially flush with non-recessed portions of the side 105*a*.

The aero cladding element 301 may be directly operably connected to the base cladding element 302 using any of a variety of methods and mechanisms to facilitate movement of the aero cladding element 301. In alternative arrangements, the aero cladding element 301 may be indirectly operably connected to the base cladding element 302 by connecting the aero cladding element 301 to another portion of the vehicle using one of the mechanisms described herein (or another mechanism), without operably connecting the aero cladding element 301 to base cladding element 302 or any other cladding element.

Various mechanisms are disclosed herein for operably connecting an aero cladding element to a vehicle, either directly or through connection to a base cladding element affixed to the vehicle. In the embodiments set forth in the following descriptions, the aero cladding element is operably connected to an associated base cladding element affixed to the vehicle side 105a. For purposes of description, various options for operably connecting the aero cladding element 301 to the base cladding element 302 as shown in FIG. 1 will be described. It will be understood that the various connection methods described may also be applicable for operably connecting other aero cladding elements to other, associated base cladding elements mounted on the vehicle 100. It will also be understood that the mechanisms described for operably connecting the aero cladding element to the base cladding element may also (with suitable adaptations) be used to operably connect the aero cladding element directly to a side of the vehicle without intermediate connection to (or use of) a base cladding element.

Referring now to FIGS. 3A-3F, in some arrangements, the aero cladding element 301 is operably connected to the base cladding element 302 by at least one hinge. In some particular arrangements, the at least one hinge is an interleaf hinge (generally designated 311). However, other types of hinges may also be used.

As is known, an interleaf hinge may be created by forming spaced-apart interleafs along mating edges of elements to be connected (in this case, the aero cladding element 301 and the base cladding element 302). Thus, interleafs 313 may be formed along an edge 322 of base cladding element 302 and interleafs 315 may be formed along an adjoining edge 323 of aero cladding element 301. Each of interleafs 313 may include an associated passage 313a structured for receiving a connecting shaft 317 therethrough. Each of interleafs 315 may also include an associated passage 315b structured for receiving the connecting shaft 317 therethrough.

As seen in FIGS. 3B and 3C, the positions of the aero cladding element interleafs 315 may be coordinated with the positions of spaces 321 between the base cladding element interleafs 313 and/or the position of a space adjacent a single base cladding element interleaf 313, so that each aero cladding element interleaf 315 is receivable in an interleaf-free space 321 formed along the base cladding element edge 322. Similarly, the positioning of the base cladding element interleafs 313 may be coordinated with the positioning of spaces 319 between the aero cladding element interleafs 315 and/or the position of a space adjacent an aero cladding element interleaf 315, so that each base cladding element interleaf 313 is receivable in in an interleaf-free space 319 formed along the aero cladding element edge 323. This may provide an arrangement of alternating base cladding element interleafs and aero cladding element interleafs as shown in FIG. 3C. In addition, the passages 315a and 313a extending through the aero cladding element interleafs 315 and the base cladding element interleafs 313, respectively, may be structured so that all of the passages are coaxial or substantially coaxial to a degree sufficient to enable a shaft 317 to pass therethrough when the edges 322 and 323 are joined, thereby enabling rotatable connection of the aero cladding element 301 with the base cladding element 302 in a manner similar to that used in a convention door hinge.

Other types of hinges may also be used to rotatably connect the aero cladding element to the base cladding element.

If required for purposes of system packaging or mounting on a vehicle, the base cladding element 302 may have recesses or cavities 325 formed along opposite side edges thereof. For example, such recesses or cavities may be structured to enable portions of the actuators (such as motors) to extend therein. Similarly, the aero cladding element 301 may have recesses or cavities 327 formed along opposite side edges thereof enable portions of the actuators (such as motors) to extend therein.

Embodiments of the aero cladding system may also include at least one actuator operably connected to the aero cladding element 301 and structured to be operable to move the aero cladding element 301 between the cladding position and the aero position. In one or more arrangements, the actuator may be a motor connected to be operable on the aero cladding element or on a connection(s) between the aero cladding element 301 and the base cladding element 302, to move the aero cladding element 301 between the cladding position and the aero position. In particular examples (such as in the embodiment shown in FIGS. 3A-3F), multiple motors 330, 331 may be used. In particular examples, the motor(s) 330, 331 may be a known or later-developed version of a direct drive motor (or "torque motor") having an output directly and coaxially connected to shaft 317 or to a joint or gear rotationally connecting the aero cladding element 301 with the base cladding element 302.

For example, as shown in FIGS. 3A-3F, a rotor (not shown) of a direct drive motor 331 may be coaxially secured to the shaft 317 connecting the aero cladding element 301 with the base cladding element 302, so that the shaft 317 rotates with the rotor. The aero cladding element 301 may be secured to the shaft 317 so as to rotate with the shaft. A stator (not shown) of the motor 331 may be attached to the base cladding element 302 so as to be static or non-rotatable with respect to the base cladding element, thereby anchoring the motor 331 for operation. Then, when the motor 331 is energized to cause the rotor and the attached shaft 317 to rotate with respect to the stator, the aero cladding element 301 will rotate in correspondence with the shaft 317 and also with respect to the base cladding element 302.

In one or more particular arrangements, and as shown in FIGS. 3B and 3C, a direct drive motor may be operably connected to each end of the shaft 317 and configured to operate as just described. The motors 330, 331 may operate simultaneously in coordination with each other to raise and lower the aero cladding element 301 as needed.

In an embodiment described herein, if required for purposes of system packaging or mounting on a vehicle, a gear may attached to an output shaft of the direct-drive motor and one or more mating gears may be mounted on a separate, rotatable shaft operably coupling the aero cladding element 301 to the base cladding element 302, thereby forming a simple gear train to transmit motion of the motor output shaft to the aero cladding element 301. Referring to FIGS. 3D, 3E, and 3F, the aero cladding element 301 may be rotated into its aero position by controlling operation of the motors 330, 331 so as to rotate the shaft 317 and attached aero cladding element 301 in rotational direction R1.

Power to the motors 330, 331 may be stopped based on when the aero cladding element 301 reaches the aero position (indicated by the dashed line in FIG. 3F). This position may be determined by the execution of a predetermined number of rotor rotations, by the aero cladding element 301 contacting a hard stop (not shown) positioned to halt rotation of the aero cladding element past the aero position, or by any other suitable method.

To rotate the aero cladding element 301 back to its cladding position (i.e. to retract the aero cladding element), the motors 330, 331 may be controlled to reverse their rotation directions.

In embodiments described herein, the aero cladding system control module 213 (described in greater detail elsewhere herein) may be configured to set a status flag to a first value when the aero cladding element(s) are deployed (e.g. after rotation of a motor output shaft a predetermined number of rotations in a respective aero cladding element deployment direction). The aero cladding system control module may also be configured to set the status flag to a second value when the aero cladding element(s) are retracted (e.g. after rotation of a motor output shaft a predetermined number of rotations in a respective aero cladding element retraction direction). By this or a similar method, the aero cladding system control module 213 may maintain a status of the aero cladding elements at any given time. In particular arrangements, the output system 135 may include an indicator light which may be controlled by the aero cladding system control module 213 to activate when the aero cladding elements are deployed and to deactivate when the aero cladding elements are retracted. This light may serve as a system status indicator to a user.

In one or more arrangements, the motors 330, 331 or other actuator(s) are powered by a wired connection to a power source in the vehicle 100 (not shown). In other arrangements, the actuator(s) may be powered by a dedicated rechargeable battery 199 secured to the base cladding element 302. In particular embodiments, the battery 199 may be integrated into the base cladding element 302, with an outer surface or cover of the battery/base cladding element being formed from (or coated with) a material capable of performing the cladding functions when not covered by the aero cladding element 301.

Attachment of the battery 199 to the base cladding element 302 or incorporation of the battery into the base cladding element 302 may enable a stand-alone aero cladding system that can be attached to (and detached from) the vehicle 100 as needed (e.g., for retrofit, replacement or repair). In particular arrangements, the battery 199 may be configured for detachment from the remainder of the vehicle for recharging and/or replacement. In other particular arrangements, the battery 199 and vehicle 100 may be configured to enable charging of the battery by vehicle power during battery use and/or during periods when the battery is not in use.

Figures 4A, 4B:
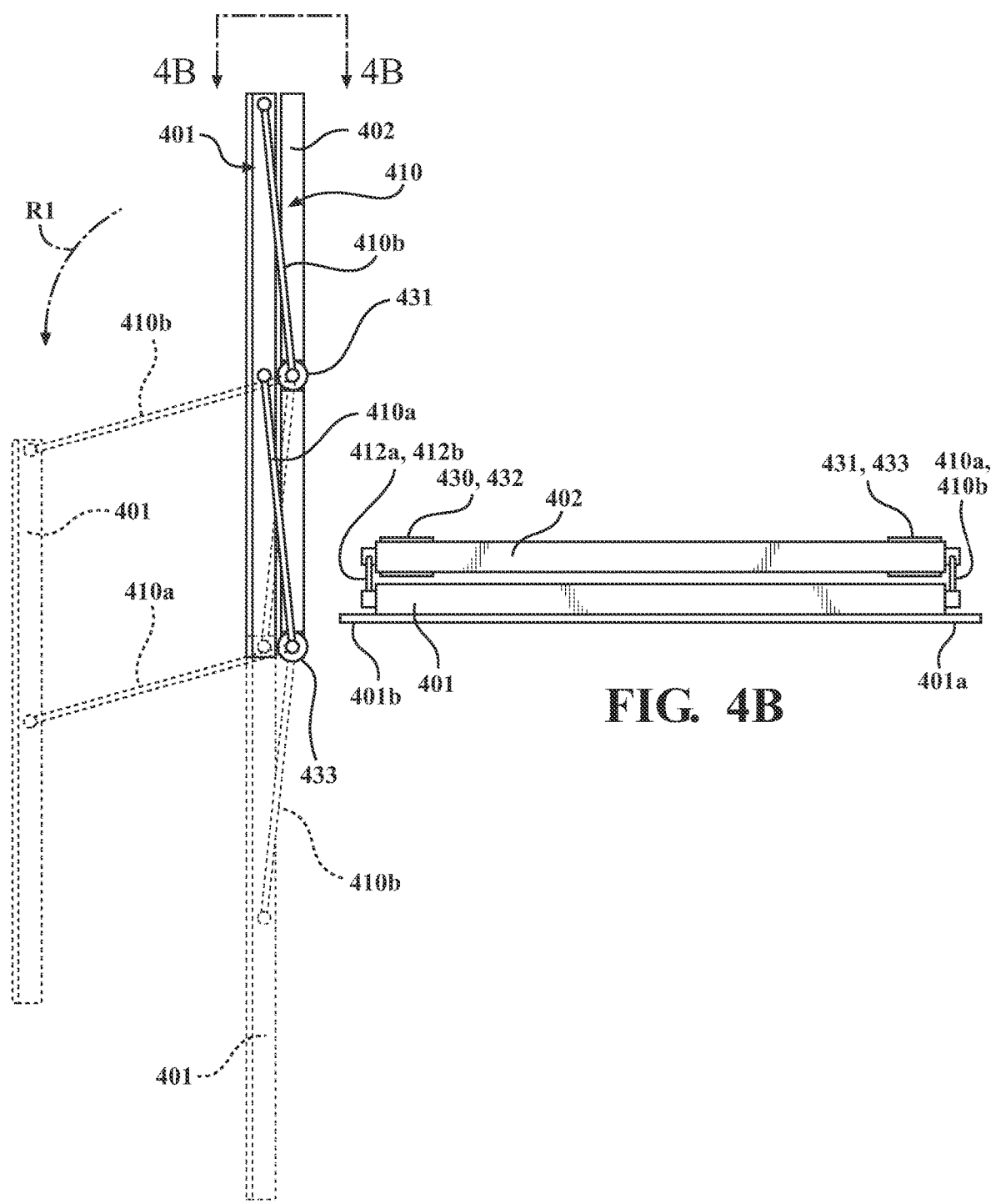
FIG. 4A is a schematic side edge view of operably connected aero cladding and base cladding elements of an aero cladding system in accordance with another embodiment described herein.
FIG. 4B is a schematic plan edge view of the connected aero cladding and base cladding elements shown in FIG. 4A.

Referring now to FIGS. 4A and 4B, in one or more alternative arrangements, an aero cladding element 401 may be operably connected to an associated base cladding element 402 by a linkage. In particular arrangements, and as shown in FIGS. 4A and 4B, the linkage may be a parallel motion linkage or "push-pull" linkage. The structure and operation of such linkages are well-known. However, any of a variety of alternative linkage structures may be used.

FIGS. 4A and 4B show an embodiment where the aero cladding element 401 and the base cladding element 402 are connected by a pair of parallel motion linkages, with a first linkage 410 operably connecting the elements 401, 402 along first side edges of the elements, and a second, similar linkage 412 operably connecting the elements 401, 402 along second, opposite side edges of the elements. Linkage 410 includes a first link 410a and a second link 410b, and linkage 412 includes a first link 412a and a second link (412b (not shown in the drawings). The aero cladding element 401 may have overlapping edges 401a, 401b formed along a side of the element structured to face outwardly away from the vehicle 100 when the aero cladding element 401 is mounted on the vehicle. These edges may help conceal the linkages 410, 412 from an observer viewing the aero cladding element 401 from the side of the vehicle.

A motor (such as a direct drive motor) may be operably connected to an end of each of links 410a, 410b, 412a, 412b that is rotatably connected to the base cladding element 402. Referring to FIGS. 4A and 4B, the motors 430-433 may be recessed into cutouts formed in base cladding element 402 and the rotor stators may be attached to the base cladding element, as previously described with respect to the embodiment shown in FIGS. 3A-3F. Motor rotors may be coupled to joints or shafts connecting the links 410a, 410b, 412a, 412b to the base cladding portion 402 so that the connecting joints rotate in conjunction with the motor outputs to rotate the respective links coupled to the joints. This causes rotation of the links 410a, 410b, 412a, 412b as shown in FIG. 4A in rotation direction R1, thereby lowering the aero cladding element 401 to its aero position (indicated by the dashed line).

Power to the motors 430-433 may be stopped based on when the aero cladding element 401 reaches the aero position. This position may be determined by the execution of a predetermined number of rotor rotations, by one of the links 410a, 410b, 412a, 412b contacting a hard stop (not shown) positioned to halt rotation of the aero cladding element 401 past the aero position, or by any other suitable method.

To rotate the aero cladding element 401 back to its cladding position (i.e. to retract the aero cladding element), the motors may be controlled to reverse their rotation directions.

Referring now to FIGS. 5A-5C, in one or more other arrangements, an aero cladding element 501 may be operably connected to an associated base cladding element 502 by an aero cladding element translation mechanism, generally designated 510. An "aero cladding element translation mechanism" is a mechanism configured to translate the aero cladding element 501 with respect to the base cladding element 502 (i.e., the aero cladding element moves along a substantially straight-line path with respect to the base cladding element). For example, in the embodiment shown in FIGS. 5A-5C, the aero cladding element 501 moves along a substantially straight line path in direction R3 toward its respective aero position (shown as a dashed line).

In the embodiment shown, along a side edge 502x of the base cladding element 502, the aero cladding element 501 is translated by a mechanism 510 comprising a pinion gear 512 mounted on an output shaft of a motor 520 (such as a direct drive motor) and a rack gear 514 structured to mateably engage the pinion gear 512 and extending along a rear face 501r of the aero cladding element 501. The mechanism may also include a lip 515 formed along edge 502x of the base cladding element 502 so as to extend over an associated edge 501e of the aero cladding element 501 (i.e., lip 515 extends over aero cladding element edge 501e). The lip 515 may help secure the aero cladding element 501 to the base cladding element 502 so as to enable translation of the aero cladding element 501 with respect to the base cladding element 502. In particular arrangements, surfaces of the lip 515 that may be in contact with the aero cladding element 501 may have roller element(s) (not shown) mounted therealong so as to facilitate sliding of the aero cladding element 501 with respect to the lip 515.

It will be understood that a similar mechanism (including motor 520', rack gear 514', and pinion gear 512') may be provided along the opposite side edge 502y of the base cladding element, to balance the forces acting on the aero cladding element 501 during movement.

As seen in FIG. 5A, the aero cladding element 501 may be translated into its aero position by controlling operation of the associated motors along each of side edges 502x, 502y of the base cladding element 502 so as to rotate the pinion gears 512, 512' coupled to the motors. Engagement of the respective rack gears 514, 514' by the pinion gears 512, 512' causes the aero cladding element 501 to translate in direction R3 (for movement to the aero position) and in the opposite direction R4 (for return to the cladding position).

Power to the motors may be stopped based on when the aero cladding element 501 reaches the aero position (indicated by the dashed line). This position may be determined by the execution of a predetermined number of rotor rotations or by any other suitable method.

Referring again to FIG. 3F, in some arrangements, the aero cladding element 301 is structured to extend below the rocker panel 100r to a level at a predetermined distance D1 above a ground surface on which the vehicle resides, when the aero cladding element is in the aero position. In some particular arrangements, the predetermined distance D1 is approximately half of a ground clearance distance GC1 above the ground surface GS1. However, the predetermined distance D1 may be greater or less than this value, according to projected operational requirements, user preferences, and other pertinent factors. A "ground clearance distance" may be a distance GC1 between a ground or road surface GS1 on which the vehicle 100 resides and a lowest portion of the vehicle between the front and rear wheelhouses, along the side of the vehicle on which the aero cladding element resides. This distance GC1 may vary according to the particular vehicle configuration. In one or more vehicle arrangements including a rocker panel, the ground clearance distance GC1 may be a distance between the lowest portion of the vehicle rocker panel and the ground surface GS1.

In some particular arrangements, the structure of the aero cladding system may enable the predetermined distance D1 (FIG. 3F) to be varied or selected by a user in accordance with the configuration of a particular vehicle. For example, in the translational aero cladding system arrangement illustrated in FIGS. 5A-5C, the distance the aero cladding element 501 resides above the ground surface GS1 in the aero position may be varied according to the ground clearance of the vehicle to narrow the gap D1 to a desired spacing, by operating the system motor(s) to control an amount that the aero cladding element is extended downwardly with respect to the base cladding element 502 or the rocker panel 100r.

As seen in FIG. 3F, the aero cladding element may be operably connected to the body along the vehicle side so as to overlie at least a portion of a side door of the vehicle when the aero cladding element is in the cladding position, and so as to reside below a rocker panel of the vehicle when the aero cladding element is in the aero position. In some arrangements, the aero cladding element is structured to overlie the rocker panel, but not overlie portions of a vehicle door residing above the rocker panel.

For example, referring to FIG. 3F, the door 100e may include beltline 100g positioned at a first predetermined distance D3 above the rocker panel 100r. As is known in the automotive field, the beltline 100g is a line representing the bottom edge of a vehicle's glass panels (e.g. windscreen, side windows and rear window). It may also represent the bottom of a vehicle's glasshouse. In particular arrangements, an aero cladding element (such as element 301) may extend to a level located at a second predetermined distance D4 below the beltline 100g when the aero cladding element is in its cladding position. In more particular arrangements, the second predetermined distance D4 is equal to approximately one third of the first predetermined distance D3. Thus, the aero cladding element may be structured to overlie a portion of a vehicle door 100e as well as the rocker panel 100r, thereby protecting the door along a width of the door and between a lower edge of the rocker panel 100r and up to the vertical distance D4 from the beltline 100g.

In one or more arrangements, the aero cladding applied to the vehicle side extends substantially along a length of the rocker panel when the aero cladding element (s) is in the cladding position. The aero cladding may be in the form of a single element (not shown) or multiple elements arranged adjacent each other, as shown in FIG. 1. In particular arrangements, a single aero cladding element may be operably connected to the body along the side so as to extend continuously and substantially along the entire length of the rocker panel 100r. Such an extended-length aero cladding element may be used in cases where the vehicle ground clearance is small enough and/or the rocker panel is vertically deep enough so that an aerodynamic benefit may be realized from using an aero cladding element structured to overlie only the rocker panel when the aero cladding element is in its cladding position.

In some arrangements, the vehicle may include a plurality of aero cladding element s, each aero cladding element being operably connected to the body along the side so as to be supported for movement between a respective cladding position and a respective aero position. For example, FIG. 1 shows a pair of adjacent aero cladding element s 301 and 351 mounted along the side of the vehicle to cover the rocker panel and portions of the vehicle doors 100d, 100e. In combination, the aero cladding element s 301 and 351 may extend substantially along the length of the rocker panel 100r.

Figure 6:
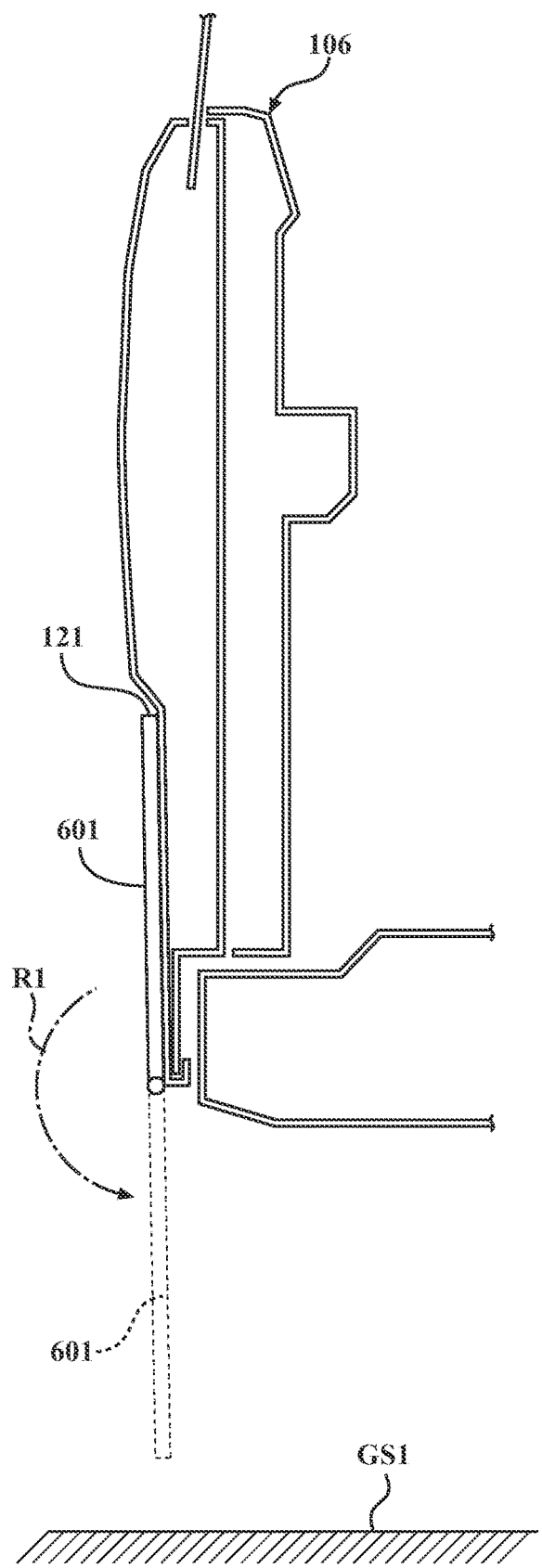
FIG. 6 is a schematic side cross-sectional view similar to the view of FIG. 3F, showing a vehicle side door incorporating another embodiment of the aero cladding system.

FIG. 6 is a schematic cross-sectional view similar to FIG. 3F showing a vehicle side door 106 incorporating another embodiment of the aero cladding system. In this embodiment, the system may include a rotatable aero cladding element 601 and all the other elements of the system described with respect to FIGS. 3A-3F, (or any of the other mechanisms described herein) with the exception of a base cladding element. In this embodiment, the aero cladding element may be directly operably connected to the side door 106 using variations of the various mechanisms described herein.

Referring again to FIG. 2, in embodiments described herein, a memory 112 may store an aero cladding element control module 213 and (optionally) other modules for facilitating control of various vehicle systems. The memory 112 is a random-access memory (RAM), read-only memory (ROM), a hard-disk drive, a flash memory, or other suitable memory for storing the module(s). The stored module(s) are, for example, computer-readable instructions that when executed by the processor(s) 110, cause the processor(s) 110 to perform the various functions disclosed herein.

The vehicle 100 can include one or more such modules. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include an aero cladding system control module 213. In one or more arrangements, the aero cladding system control module 213 may include computer-readable instructions that when executed by the processor 110 cause the processor to autonomously (i.e., without the need for human intervention) control operation of one or more actuators to move the aero cladding element to a cladding position (or "first position") responsive to the vehicle speed falling below a predetermined minimum speed for aero cladding element deployment. The aero cladding system control module 213 may also include computer-readable instructions that when executed by the processor cause the processor to autonomously control operation of the one or more actuators to move an aero cladding element to an aero position (or "second position") position responsive to a vehicle in which the system resides reaching a predetermined minimum speed for aero cladding element deployment.

In some arrangements, the aero cladding system control module 213 may include computer-readable instructions that when executed by the processor 110 cause the processor to enable a user to specify the predetermined minimum speed at which the aero cladding element will be deployed. A user may be enabled or queried to enter a selected speed via the input system 130. The module 213 may then autonomously control operation of the pertinent actuators to lower the aero cladding element when the selected predetermined minimum speed is reached by the vehicle 100. The module 213 may also autonomously control operation of the pertinent actuators to raise or retract the aero cladding element when the vehicle speed falls below the selected predetermined minimum speed.

In some arrangements, the aero cladding system control module 213 may include computer-readable instructions that when executed by the processor 110 cause the processor to enable a user to generate a first control command to manually control operation of the actuator(s) to move the aero cladding element to the aero position, and to enable a user to generate a second control command to manually control operation of the actuator(s) to move the aero cladding element to the cladding position. This capability embodies a "manual mode" or "manual override" 211 of the aero cladding system in which a user may choose when to raise and lower the aero cladding element. The user may choose to operate the aero cladding element(s) based on visual indication of a vehicle speed by the speedometer. Alternatively, the user may decide not to operate the aero cladding element(s) at all.

In some arrangements, the aero cladding system control module 213 may include computer-readable instructions that when executed by the processor 110 cause the processor to enable a user to define the aero position of the aero cladding element by specifying a distance of the aero cladding element from a ground surface GS1 when the system is mounted on the vehicle 100. This provides the user with some flexibility regarding coverage of the open space below the vehicle, in embodiments of the system such as shown in FIGS. 5A-5C, which enable the distance D1 between the lowest edge of the aero cladding element and the ground surface GS1 to be controlled during in the aero position of the aero cladding element. Thus, if the user expects to be driving on a smooth, level road surface, the user may choose to lower the aero cladding element to a point where a relatively small distance D1 remains between the lowest edge of the aero cladding element and the ground surface GS1. This may be implemented by enabling the user (through interaction via the input system 130 and output system) to control the actuator(s) to gradually lower the aero cladding element until it reaches a desired height above the ground surface.

For example, the control module 213 may be configured to count the motor shaft rotations performed when moving the aero cladding element from the cladding position to the aero position. The user may stop operation of the motor(s) when the aero cladding element reaches the desired height above the ground surface. The control module 213 may store in memory the number of motor shaft rotations associated with achieving the desired height of the aero cladding element. Then, during manual or autonomous operation of the aero cladding system, the motor(s) may be controlled to lower the aero cladding element to the desired height. Any user-specified parameter values, selected user options, and similar information may be stored in a dedicated portion 215 of memory 112, if desired.

Figure 7:
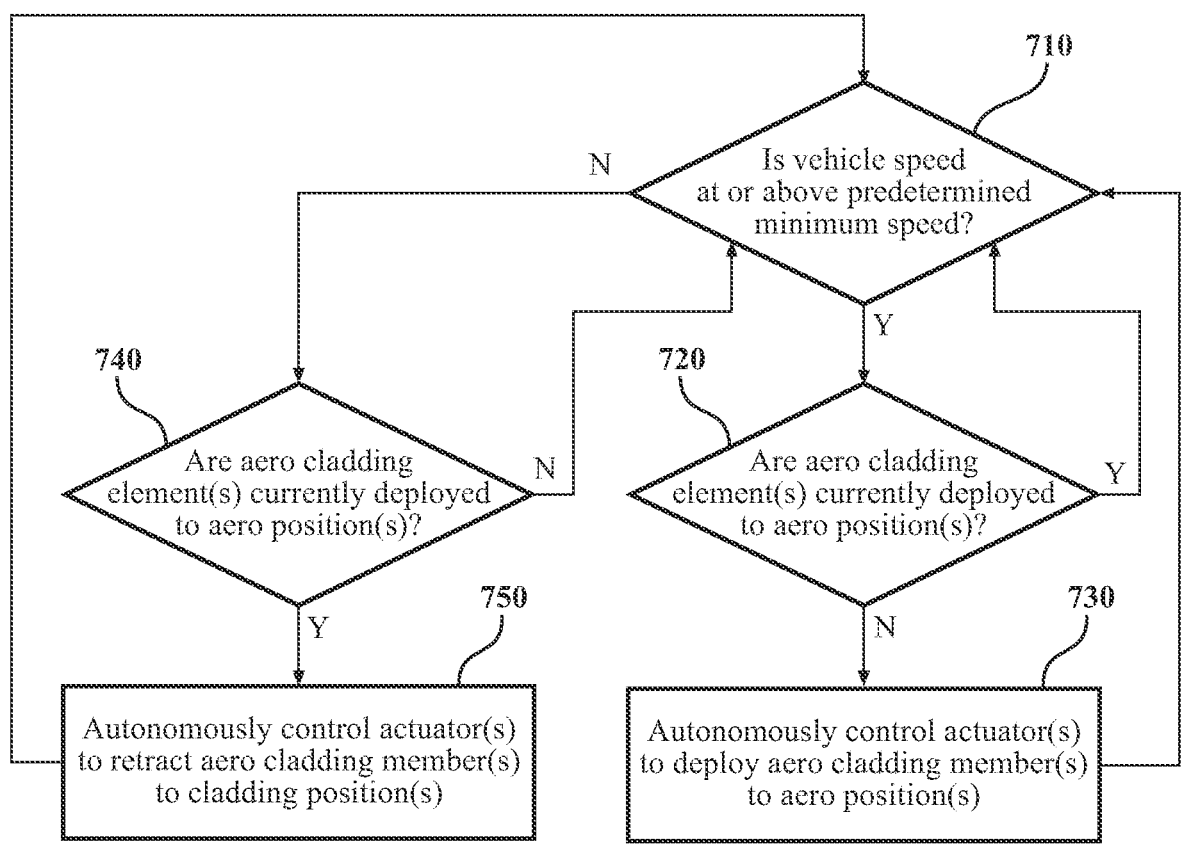
FIG. 7 is a schematic flow diagram illustrating autonomous operation of an embodiment of the aero cladding system.

FIG. 7 is a schematic flow diagram illustrating autonomous operation of an embodiment of the aero cladding system. In block 710, the aero cladding system control module 213 may determine if the vehicle speed is at or above the predetermined minimum speed for triggering deployment of the aero cladding element(s). If the vehicle speed is at or above the predetermined minimum speed, control may pass to block 720, where the aero cladding system control module 213 may determine if the aero cladding elements(s) are currently deployed to their respective aero position(s). This may be done with reference to the control module status flag previously described. If the aero cladding element(s) are currently deployed to their respective aero position(s), control may revert back to block 710, where the control module 213 continues to monitor the vehicle speed. However, if the aero cladding element(s) are not currently deployed to their respective aero position(s), control may pass to block 730, where the control module 213 may autonomously control the pertinent actuator(s) to deploy to aero cladding element(s) to their respective aero position(s).

Returning to block 710, if it is determined in block 710 that the vehicle speed is not at or above the predetermined minimum speed for triggering deployment of the aero cladding element, control may pass to block 740, where the control module 213 may determine if the aero cladding element(s) are currently deployed to their respective aero positions. If the aero cladding element(s) are not currently deployed to their respective aero positions, control may revert back to block 710, where the control module 213 continues to monitor the vehicle speed. However, if the aero cladding element(s) are currently deployed to their respective aero positions, control may pass to block 750, where the control module 213 may autonomously control the pertinent actuator(s) to retract aero cladding elements(s) to their respective cladding position(s).

Figure 8:
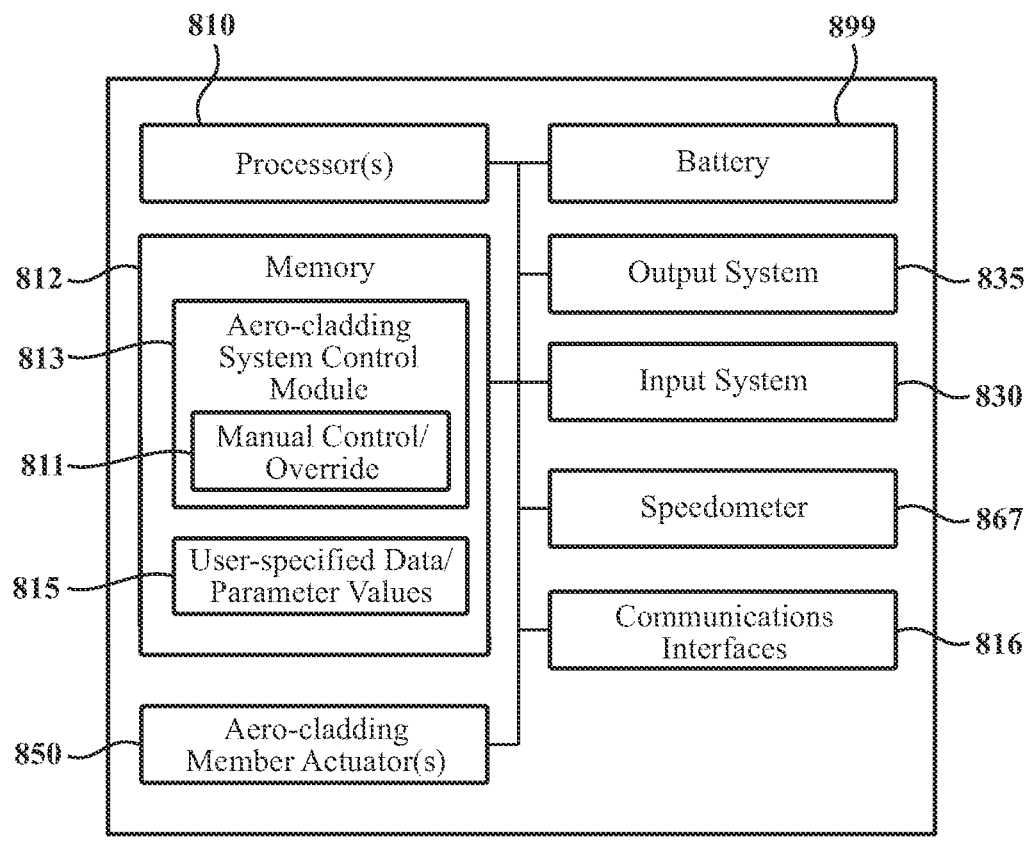
FIG. 8 is a block schematic diagram of another embodiment of the aero cladding system structured as an add-on or retrofit for installation into a vehicle.

Referring now to FIG. 8, in another aspect of the embodiments provided herein, the aero cladding system may be structured as a modular system configured to be mountable on the vehicle after vehicle completion, as an add-on or retrofit. In this aspect, the aero cladding system may include at least one base cladding element and at least one aero cladding element operably connected to the at least one base cladding element so as to be movable relative to the base cladding element between a first position and a second position different from the first position. In addition, the base cladding element may be structured for attachment to the vehicle. Thus, the base cladding element may be used as a means of attaching an independently manufactured aero cladding system to a vehicle.

In one or more arrangements, the first position of the aero cladding element may be a position which would constitute a "cladding position" of the element as previously described, when the aero cladding system is installed on a vehicle. Similarly, the second position of the aero cladding element may be a position which would constitute an "aero position" of the element as previously described, when the aero cladding system is installed on a vehicle.

Embodiments of any modular or add-on aero cladding system may incorporate any of the elements shown in FIG. 2, and additional elements if needed. For example, FIG. 8 is a block schematic diagram of an embodiment 801 of an add-on aero cladding system. The system 801 may include processor(s) 810, a memory 812 including an aero cladding system control module 813 with a manual override capability 811 and storage 815 for user-specified parameters, an input system 830, and an output system 835, all functioning (with regard to the aero cladding elements) in the same manner as similar features previously described with reference to FIG. 2. The system 801 may include actuators 850 dedicated to moving the aero cladding elements between their respective cladding positions and aero positions. The system 801 may include a battery 899 as previously described, operably connected to other elements of the system for powering the system independently of other power sources. The speedometer 867 may be a known or later-developed GPS speedometer. The system 801 may also include one or more wireless communication interfaces 816 to enable wireless control of the actuators 850 from a control unit mountable in the vehicle occupant compartment and incorporating the input system 830 and output system 835.

Embodiments of any modular or add-on aero cladding system may also incorporate any or all aspects of the any of the mechanisms previously described for operably connecting the aero cladding element to the base cladding element, and for controlling operation of the aero cladding element as previously described. These mechanisms may operate in the same manner as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle, comprising:
a body including a side;
a rocker panel extending along the side;
a base cladding element attached to a portion of the vehicle and overlying the rocker panel; and
at least one aero cladding element operably connected to the base cladding element so as to be movable with respect to the base cladding element between a cladding position overlying the base cladding element, and an aero position.

2. The vehicle of claim 1, wherein the at least one aero cladding element extends substantially along a length of the rocker panel when the at least one aero cladding element is in the cladding position.

3. The vehicle of claim 2, wherein the side includes a beltline positioned at a first predetermined distance above the rocker panel, and wherein the at least one aero cladding element extends to a level located at a second predetermined distance below the beltline when the at least one aero cladding element is in the cladding position.

4. The vehicle of claim 3, wherein the second predetermined distance is equal to approximately one third of the first predetermined distance.

5. The vehicle of claim 2, wherein the at least one aero cladding element is structured to extend below the rocker panel to a level at a predetermined distance above a ground surface on which the vehicle resides, when the at least one aero cladding element is in the aero position.

6. The vehicle of claim 5, wherein the predetermined distance is approximately half of a ground clearance distance above the ground surface.

7. The vehicle of claim 1, wherein the vehicle includes a recess formed along the side, and wherein the at least one aero cladding element is received in the recess when the at least one aero cladding element is in the cladding position.

8. The vehicle of claim 1, wherein the vehicle includes a plurality of aero cladding element s, each aero cladding element being operably connected to the body along the side so as to be supported for movement between a respective cladding position and a respective aero position.

9. The vehicle of claim 1, wherein the at least one aero cladding element is rotatably connected to the body so that a side of the at least one aero cladding element is structured to face toward the body when the at least one aero cladding element is rotated to the cladding position, and so that the side is structured to face away from the body when the at least one aero cladding element is rotated to the aero position.

10. A vehicle, comprising:
a body including a side; and
at least one aero cladding element operably connected to the body along the side so as to be supported for movement between a cladding position and an aero position, wherein the at least one aero cladding element is operably connected to the body along the side so as to overlie at least a portion of a side door of the vehicle when the at least one aero cladding element is in the cladding position, and so as to reside below a rocker panel of the vehicle when the at least one aero cladding element is in the aero position.

11. An aero cladding system for a vehicle, the system comprising:
a rocker panel;
at least one base cladding element attached to a portion of the vehicle and structured to overlie the rocker panel;
at least one aero cladding element operably connected to the at least one base cladding element so as to be movable relative to the at least one base cladding element between a first position and a second position different from the first position; and
at least one actuator operably connected to the at least one aero cladding element and structured to be operable to move the at least one aero cladding element between the first position and the second position.

12. The aero cladding system of claim 11, wherein the at least one aero cladding element is operably connected to the at least one base cladding element by at least one linkage.

13. The aero cladding system of claim 11, further comprising:
a processor; and
a memory communicably coupled to the processor and storing an aero cladding system control module including computer-readable instructions that when executed by the processor cause the processor to:
control operation of the at least one actuator to move the at least one aero cladding element to the second position responsive to a vehicle in which the system resides reaching a predetermined minimum speed; and control operation of the at least one actuator to move the at least one aero cladding element to the first position responsive to the vehicle speed falling below the predetermined minimum speed.

14. The aero cladding system of claim 13, wherein the aero cladding system control module includes computer-readable instructions that when executed by the processor cause the processor to enable a user to specify the predetermined minimum speed.

15. The aero cladding system of claim 13, wherein the aero cladding system control module includes computer-readable instructions that when executed by the processor cause the processor to:
   enable a user to generate a first control command to manually control operation of the at least one actuator to move the at least one aero cladding element to the second position; and
   enable a user to generate a second control command to manually control operation of the at least one actuator to move the at least one aero cladding element to the first position.

16. The aero cladding system of claim 13, wherein the aero cladding system control module includes computer-readable instructions that when executed by the processor cause the processor to enable a user to define the second position by specifying a distance of the at least one aero cladding element from a ground surface when the system is mounted on a vehicle.

17. An aero cladding system for a vehicle, the system comprising:
   at least one base cladding element;
   at least one aero cladding element operably connected to the at least one base cladding element so as to be movable relative to the at least one base cladding element between a first position and a second position different from the first position; and
   at least one actuator operably connected to the at least one aero cladding element and structured to be operable to move the at least one aero cladding element between the first position and the second position,
   wherein the at least one aero cladding element is operably connected to the at least one base cladding element by at least one hinge.

18. An aero cladding system for a vehicle, the system comprising:
   at least one base cladding element;
   at least one aero cladding element operably connected to the at least one base cladding element so as to be movable relative to the at least one base cladding element between a first position and a second position different from the first position;
   at least one actuator operably connected to the at least one aero cladding element and structured to be operable to move the at least one aero cladding element between the first position and the second position; and
   a battery incorporated into the least one base cladding element and configured to supply power to the at least one actuator for moving the at least one aero cladding element.

19. An aero cladding system for a vehicle, the system comprising:
   at least one base cladding element;
   at least one aero cladding element operably connected to the at least one base cladding element by at least one parallel motion linkage so as to be movable relative to the at least one base cladding element between a first position and a second position different from the first position; and
   at least one actuator operably connected to the at least one aero cladding element and structured to be operable to move the at least one aero cladding element between the first position and the second position.

20. An aero cladding system for a vehicle, the system comprising:
   at least one base cladding element; and
   at least one aero cladding element operably connected to the at least one base cladding element by an aero cladding element translation mechanism so as to be movable relative to the at least one base cladding element between a first position and a second position different from the first position, the translation mechanism including a pinion gear mounted on an output shaft of a motor and a rack gear structured to mateably engage the pinion gear and extending along a rear face of the aero cladding element.

* * * * *